April 2, 1935.　　　　H. J. CRINER　　　　1,996,462
BREAD SLICING MACHINE
Filed Jan. 31, 1930　　　2 Sheets-Sheet 1
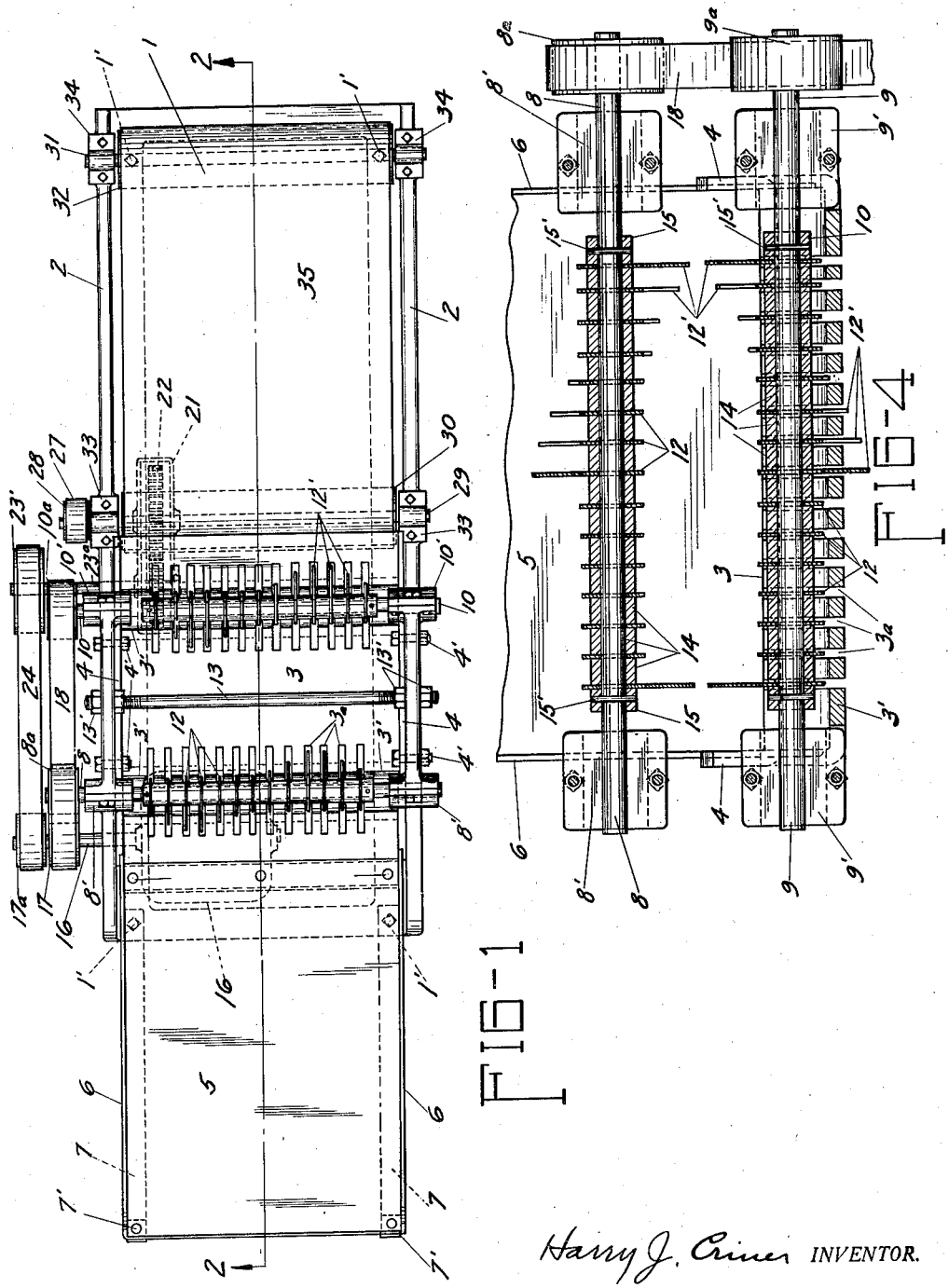

April 2, 1935. H. J. CRINER 1,996,462
BREAD SLICING MACHINE
Filed Jan. 31, 1930 2 Sheets-Sheet 2
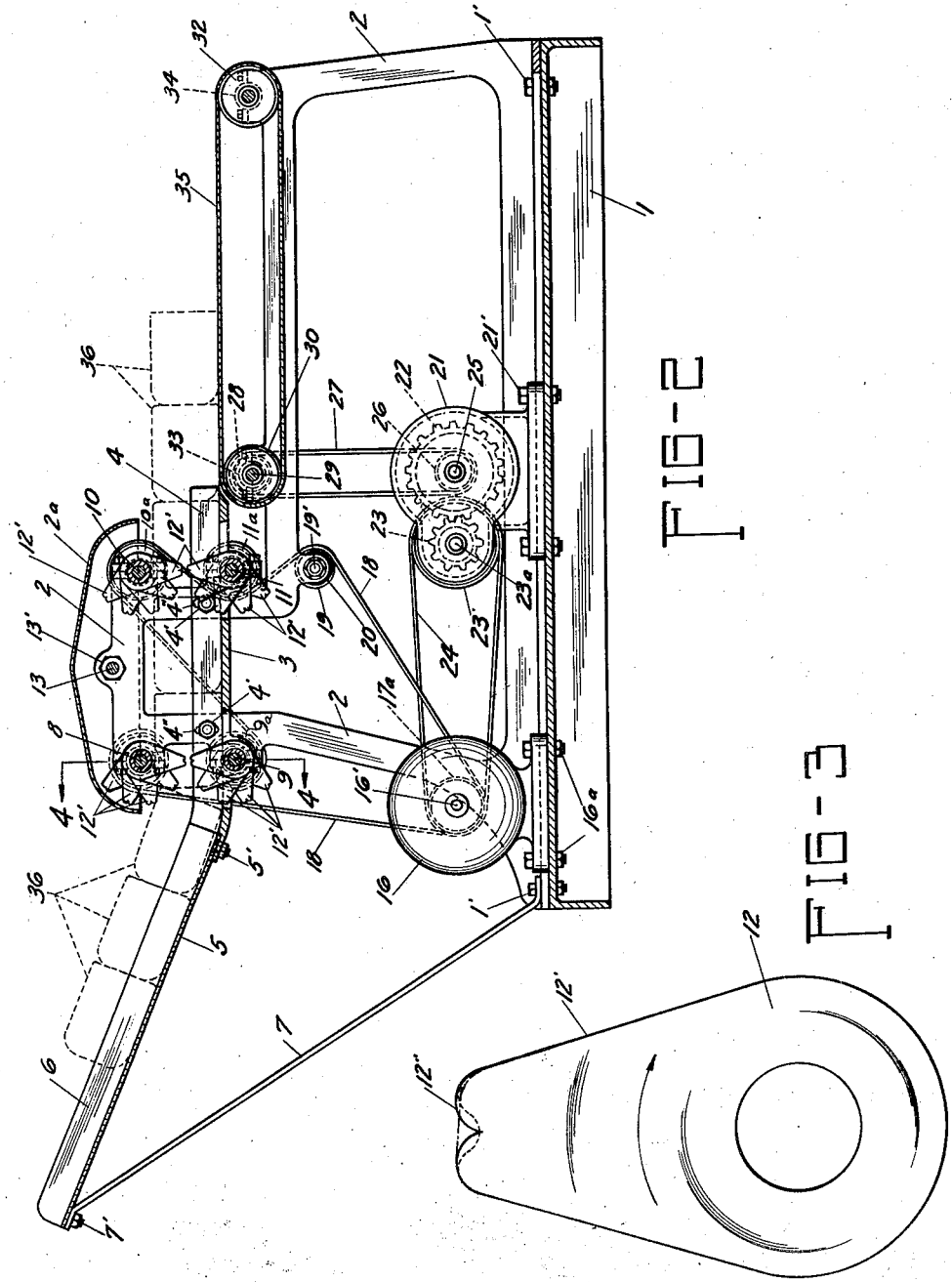

Patented Apr. 2, 1935

1,996,462

UNITED STATES PATENT OFFICE 1,996,462

BREAD SLICING MACHINE

Harry J. Criner, Davenport, Iowa, assignor, by mesne assignments, to The Micro Corporation, Bettendorf, Iowa, a corporation of Delaware Application January 31, 1930, Serial No. 424,849

11 Claims. (Cl. 146—98)

My invention relates to improvements in bread slicing machines.

The objects of my invention are:

1. To provide a machine for slicing entire loaves of bread at one time which will slice bread fresh from the oven as well as bread which has been out of the oven for varying periods and which will have superior advantages in simplicity, economy of manufacture, durability, quietness of operation, efficiency, and speed;

2. To provide a bread slicing machine which will operate effectively with a continuous feed;

3. To provide a machine which will slice bread in thinner slices than has heretofore been found practicable.

I attain these objects by the means illustrated in the accompanying drawings, in which,—

Figure 1 is a top or plan view or my machine;

Figure 2 is a vertical section on the line 2—2 of Figure 1;

Figure 3 is an enlarged detail of my preferred form of cutting blade;

Figure 4 is an enlarged detail elevation of a pair of shafts with cutting blades mounted thereon, showing the cutting blades and spacers in section on the center of the shafts.

My machine comprises a base, 1, of cast-iron or other suitable material with side frames, 2, bolted or otherwise suitably secured thereto. The side frames are secured to each other at the top by a tie-rod, 13, threaded at both ends and secured in place by nuts, 13'. A table, 3, extends transversely of the machine and is provided with side bars, 4, which are secured to the side frames by bolts, 4'.

A feed chute, 5, has its lower end secured to the front end of the table, 3, by bolts, 5'. For convenience I refer to the left of Figures 1 and 2 as the front of the machine and to the right of those figures as the rear of the machine.

The front end of the chute, 5, is inclined upwardly at a sufficient angle to cause the bread to feed downwardly to the cutters by gravity when placed in the chute, 5, and the front end is secured by braces, 7, the upper ends of which are secured to the chute, 5, by bolts, 7', and the lower ends are secured to the frame, 1, by one of the base bolts, 1'.

At the rear of the table, 3, I provide a canvas or belt conveyor, 35, running upon rollers, 30 and 32. These rollers are secured upon shafts, 29 and 31, respectively which shafts are mounted in bearings, 33 and 34, united to the side frames, 2. A pulley, 28, is mounted upon one end of the shaft 29, with a belt, 27, passing around said pulley to drive same.

The table, 3, is slotted longitudinally with slots, 3a. Just below the table I mount shafts, 9 and 11, in suitable bearings, 9' and 11', secured to the side frames. Upon these shafts I mount a plurality of cutter blades preferably having a circular body, 12, with a flat extension, 12' united thereto. The outer ends of the extensions, 12', are sharpened and are preferably formed in scallops as shown at 12" in Figure 3, but may be sinuate as shown in dotted line in Figure 3 or in the form shown by broken line in Figure 3, or any other desired form.

I prefer to form my blades with the circular body just enough larger than the shaft to furnish the necessary strength and to taper the blades from the greatest diameter of the body downwardly to the outer end so that the outer ends of the blades will be one-half, or less than one-half, the greatest transverse diameter of the blade, thus reducing friction. I prefer to taper both sides of my blade uniformly, but it is obvious that the front or advancing edge may be tapered either more or less than the rear edge without departing from the spirit of my invention. To still more reduce the friction, I form these blades of the thinnest steel which will afford sufficient rigidity. In practice I have found that if run at high speeds, blades as thin as from .012 to .015 of an inch in thickness may be used successfully.

As the cutter blades, 12, are intended to revolve at very high speed relative to the feeding movement of the bread, the cutting will all be done by the sharpened portion of the blades, but a portion of the body of the blade and the intermediate portion of the extension perform a certain function in spreading the cut portion of the slices apart and so facilitate smooth cutting by the cutting edges of the blades. The forward edge of the entire extension and of a portion of the body of each blade, may be thinned down or sharpened to facilitate the spreading action of the blade and reduce friction.

In mounting the cutter blades, 12, upon the cutter shafts of my machine, I mount them in varying relative angular positions so as to reduce so far as possible, friction due to side pressure of the blades upon the slices while being cut. I prefer to mount the blades of each series with a regular, progressive, angular variation along the shaft and in practice I have found a spiral arrangement of blades to give the best results, although I do not limit my claims to any particular arrangement of the blades as various arrangements of them may be made which will vary somewhat in effectiveness.

The blades upon the shafts, 9 and 11, are mounted so as to project upwardly through the slots in the table, 3, and the table, 3, may be made adjustable by providing slots, 4", in the sides, 4, of the table or by any other suitable means.

I prefer to adjust the relative positions of the table, 3, and the shafts, 9 and 11, so that the cutting edges of the blades will cut the loaves of bread to a height slightly less than one-half of the height of the loaf as it lies upon the table, 3.

I mount a corresponding pair of shafts, 8 and 10, in bearings, 8' and 10', secured to the side frames, 2, and upon each of these shafts I mount a corresponding series of cutting blades, 12.

The blades, 12, upon the shafts, 8 and 10, are mounted in the same vertical planes as the corresponding blades upon the shafts, 9 and 11, and I prefer to mount the upper and lower blades in such relative positions that the cutting edges of the upper blades will be at the lowest point of their travel when the cutting edges of the corresponding blades of the lower series are at the highest point of their travel.

In practice it has been found that when the cutting blades are spaced half an inch apart and enough of them are mounted upon a shaft to slice an entire loaf of bread at one operation, if the bread is very fresh, some difficulty is experienced because of the side pressure of the blades upon the slices causing friction and because there is a tendency of a fresh loaf of bread to yield while being cut. To overcome this difficulty by reducing the number of blades which are cutting a given loaf of bread at a given time, I have arranged a plurality of series of cutting blades. In the drawings I have shown four sets of blades arranged upon two pairs of shafts. Each pair of shafts comprises an upper and lower shaft and in the drawings the shafts of each pair are shown mounted in the same vertical plane.

When only two pairs of shafts are used, the cutters upon each pair would cut one-half of the desired number of slices of bread, or rather, would make one-half of the desired number of cuts in the bread and these would be arranged alternately so that the slices cut by the cutters of the second pair would alternate with the slices cut by the cutters of the first pair.

I do not limit my claims to two pairs of shafts. It is obvious that the friction upon the bread may be still further reduced by using three or four pairs of shafts which would correspondingly reduce the number of blades acting upon a given loaf at a given time.

Neither do I limit my claims to the arrangement of each pair of shafts in a vertical plane, because the upper shafts may be mounted either ahead of or to the rear of the lower shafts without impairing the operation of the machine.

The arrangement of a feed chute in my device obviates the necessity of a mechanical feed, as the gravity feed will be sufficient to carry the bread to the cutters and the cutters revolve in a direction which will carry the loaves on through.

In order to prevent back pressure upon the bread and to speed up delivery of the bread to a wrapping machine, it is desirable to have a conveyor of some kind and I prefer to use a belt conveyor of the type shown, the speed of which may be adjusted at the most efficient rate to carry away the bread from the cutters and also to synchronize the machine with a wrapping machine.

The cutter shafts, 8, 9, 10 and 11, are provided with pulleys, 8a, 9a, 10a and 11a, at one end thereof, adapted to be driven by a belt, 18, which also passes over an idler pulley, 19, mounted upon a shaft, 19', having its ends secured in suitable bearings, 20, in the side frames, 2.

The motor, 16, is mounted upon the base, 1, and secured thereto by bolts, 16a. The motor shaft, 16', carries a pulley, 17a, which drives a belt 24, which in turn passes over a pulley, 23', mounted upon a shaft, 23a, upon which a pinion or gear wheel, 23, is secured which meshes with a gear wheel, 22, mounted upon a shaft, 25, upon which a belt pulley, 26, is mounted carrying a belt, 27, which drives the conveyor pulley, 28.

The motor shaft, 16', carries an additional drive pulley, 17a, which drives the belt, 18, passing around the idler pulley, 19, and the cutter shaft pulleys, 8a, 9a, 10a and 11a.

In the operation of my machine the motor is first started and when the cutting shafts have attained the desired speed, which should be from 3000 to 4000 R. P. M., the chute is filled with bread and the force of gravity will carry it downward or it may be pushed downward manually against the cutters. As fast as the bread passes through the cutters, additional loaves are placed in the machine. The bread may be placed in the chute either manually or by mechanical means as desired. As the bread passes through the cutters, it is carried onto the conveyor apron or belt and carried to the discharge end of the machine where it may be taken up manually or by mechanical means.

By the use of two pairs of cutter shafts, bread fresh from the oven may be cut into half inch slices without difficulty and by using three pairs of cutters, it may be cut into extremely thin slices.

In feeding the loaves to the cutters, they may be placed in the chute upon one side as shown in the drawings or upon their bottoms, although I prefer to feed the bread to the cutters upon one side so that the bottom of the bread reaches the cutters first, as the bottom of the loaf is usually a little firmer than the sides or top and there is greater resistance to crushing and distortion.

The upper and lower shafts may be made adjustable so that the space between the cutting edges of the blades may be varied and thus leave more or less of an unsevered portion connecting the adjacent slices.

The gears, 23 and 22, are preferably covered by a gear case or housing, 21, united to the base by bolts, 21'.

Any suitable form of guard or housing of sheet metal or other suitable material, may be used to prevent access to the knives. In Figure 2 I have shown in dotted lines such a housing, 2a, which may be secured to the cross-tie, 13, and side frames, 2, by the outer nuts, 13'. The housing is omitted in Figure 1.

My invention may also be utilized for slicing loaves of bread with cuts extending entirely through the loaf by lengthening either the upper or lower blades and by spacing the shafts apart horizontally so that the ends of the blades will not clash. It is obvious, also, that by lengthening the blades upon either the upper or lower shafts to cut through the entire thickness of a loaf of bread, the other shafts may be omitted. In this way a loaf of bread may be sliced entirely through by two or three sets of blades secured upon shafts mounted in the same plane, the blades being so arranged that the blades of the second series alternate with the blades of the first series; or, with three series, the first will make one-third of the necessary cuts, the second series, one-third, and the third series, the remaining one-third.

I claim:

1. In a bread slicing machine, the combination with a base, of side frames, a table united thereto, a plurality of successive pairs of cutter shafts revolvably mounted in the frame, each pair of shafts comprising parallel upper and lower shafts spaced apart, a series of thin, narrow, tapered cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, and means to rotate the shafts uniformly at high speed.

2. In a bread slicing machine, the combination with a base, of side frames, a table united thereto, a plurality of successive pairs of cutter shafts revolvably mounted in the frame, each pair of shafts comprising parallel upper and lower shafts adjustably spaced apart, a series of thin, narrow cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, and means to rotate the shafts uniformly at high speed.

3. In a bread slicing machine the combination with a base, of side frames, a table united thereto, a plurality of successive pairs of cutter shafts revolvably mounted in the frame, each pair of shafts comprising parallel upper and lower shafts spaced apart, a series of thin, narrow cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, the blades upon all the shafts being so arranged that the corresponding blades upon any given pair of shafts extend radially in opposite directions therefrom, and means to rotate the shafts uniformly at high speed.

4. In a bread slicing machine, the combination with a base, of side frames, a table united thereto, a plurality of successive pairs of cutter shafts revolvably mounted in the frame, each pair of shafts comprising parallel upper and lower shafts spaced apart, a series of thin, narrow cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, the blades upon each shaft being arranged in a helical position thereon, and means to rotate the shafts uniformly at high speed.

5. In a bread slicing machine, the combination with a base, of side frames, a table united thereto, a plurality of successive pairs of cutter shafts removably mounted in the frame, each pair of shafts comprising parallel upper and lower shafts spaced apart, a series of thin, narrow cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, the blades upon all the shafts being so arranged that the corresponding blades upon any given pair of shafts extend radially in opposite directions therefrom, the shafts of each pair of shafts being so spaced apart as to leave a slight clearance between the paths of the cutting ends of opposed blades, and means to rotate the shafts uniformly at high speed.

6. In a bread slicing machine, the combination with a base, of side frames, a table united thereto, a plurality of successive pairs of cutter shafts revolvably mounted in the frame, each pair of shafts comprising parallel upper and lower shafts spaced apart, a series of thin, narrow cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, the blades upon all the shafts being so arranged that the corresponding blades upon any given pair of shafts extend radially in opposite directions therefrom, the blades upon each shaft being arranged in a helical position thereon, and means to rotate the shafts uniformly at high speed.

7. In a bread slicing machine, the combination with a base, of side frames, a table united thereto, a plurality of successive pairs of cutter shafts revolvably mounted in the frame, each pair of shafts comprising parallel upper and lower shafts spaced apart, a series of thin, narrow cutting blades rigidly secured to each shaft and spaced apart thereon, each blade being indented and sharpened to a keen knife edge at its outer end, the respective blades upon each successive pair of shafts being arranged to travel in planes which alternate with the paths of the blades of the preceding or following shaft or shafts, and means to rotate the shafts uniformly at high speed.

8. A bread slicing machine, comprising a base, side frames, a table united thereto, a plurality of successive pairs of cutter shafts revolvably mounted in the frame, each pair of shafts comprising parallel upper and lower shafts spaced apart, a series of thin, tapered cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, and means to rotate all the shafts uniformly at high speed.

9. In a bread slicing machine, the combination with side frames, of a table united thereto, a plurality of successive pairs of cutter shafts revolvably mounted in the frame, each pair of shafts comprising parallel upper and lower shafts spaced apart, a series of thin, narrow cutting blades rigidly secured to each shaft and spaced apart thereon, each blade being sharpened to a keen knife edge at its outer end, the respective blades upon each successive pair of shafts being arranged to travel in planes which alternate with the paths of the blades of the preceding or following shaft or shafts, the blades upon all the shafts being so arranged that the corresponding blades upon any given pair of shafts extend radially in opposite directions therefrom, the blades upon each shaft being arranged in a helical position thereon, the shafts of each pair of shafts being so spaced apart as to leave a slight clearance between the paths of the cutting ends of opposed blades, and means to rotate the shafts uniformly at high speed.

10. A bread slicing machine comprising a framework, a plurality of upper rotary shafts carried by said framework, a plurality of spaced cutters mounted on each of said upper rotary shafts, the cutters on each shaft being offset relative to the cutters on the adjacent shaft, a plurality of lower rotary shafts carried by said framework, a plurality of cutters on each of said lower shafts, the cutters on each lower shaft being offset relative to the cutters on the adjacent lower shaft, each cutter on each of said lower shafts being in the same plane as a cutter on one of the upper shafts whereby opposed cuts may be made from opposite sides of the loaf being sliced, and means for rotating all of said cutters.

11. A bread slicing machine comprising a framework, a plurality of upper rotary shafts carried by said framework, a plurality of spaced cutters mounted on each of said upper rotary shafts, the cutters on each shaft being offset relative to the cutters on the adjacent shaft, a plurality of lower rotary shafts carried by said framework, a plurality of cutters on each of said lower shafts, the cutters on each lower shaft being offset relative to the cutters on the adjacent lower shaft, each cutter on each of said lower shafts being in the same plane as a cutter on one of the upper shafts and being spaced therefrom during operation whereby opposed cuts may be made from opposite sides of the loaf being sliced and to leave narrow uncut portions through the central zone of the sliced loaf, and means for rotating all of said cutters.

HARRY J. CRINER.

CERTIFICATE OF CORRECTION.

Patent No. 1,996,462. April 2, 1935.

HARRY J. CRINER.

It is hereby certified that error appears in the printed specification of the above numbered patent requiring correction as follows: Page 3, second column, line 2, claim 5, for "removably" read revolvably; and that the said Letters Patent should be read with this correction therein that the same may conform to the record of the case in the Patent Office.

Signed and sealed this 28th day of May, A. D. 1935.

Leslie Frazer (Seal) Acting Commissioner of Patents.